US012643167B2

(12) United States Patent
Kolbasow et al.

(10) Patent No.: US 12,643,167 B2
(45) Date of Patent: Jun. 2, 2026

(54) PRESS-FORMING DEVICE FOR DEPOSITING SOLDER AND PRODUCING INDIVIDUAL SOLDER BODIES

(71) Applicant: Pac Tech—Packaging Technologies GmbH, Nauen (DE)

(72) Inventors: Andrej Kolbasow, Paulinenaue (DE); Matthias Fettke, Berlin (DE)

(73) Assignee: Pac Tech—Packaging Technologies GmbH, Nauen (DE)

( * ) Notice: Subject to any disclaimer, the term of this patent is extended or adjusted under 35 U.S.C. 154(b) by 810 days.

(21) Appl. No.: 17/897,785

(22) Filed: Aug. 29, 2022

(65) Prior Publication Data
US 2023/0105729 A1 Apr. 6, 2023

(30) Foreign Application Priority Data
Oct. 6, 2021 (LU) ........................................ 500709

(51) Int. Cl.
*B23K 3/06* (2006.01)
*B23K 1/005* (2006.01)
(Continued)

(52) U.S. Cl.
CPC .......... *B23K 3/0623* (2013.01); *B23K 1/0056* (2013.01); *B23K 3/08* (2013.01); *B23K 31/12* (2013.01)

(58) Field of Classification Search
CPC ........ B23K 31/12; B23K 1/0056; B23K 3/08; B23K 3/0623
See application file for complete search history.

(56) References Cited

U.S. PATENT DOCUMENTS 5,395,037 A    3/1995 Takahashi et al. ..... H01L 21/60
                                             228/173.5
5,653,381 A * 8/1997 Azdasht ............... B23K 1/0056
                                             228/41
(Continued)

FOREIGN PATENT DOCUMENTS

CN         1457956 A * 11/2003
CN         1645584 A * 7/2005  ............. H01L 24/78
(Continued)

OTHER PUBLICATIONS

Notice of Allowance of the Japanese Patent Office in the related Japanese Patent application JP2022-129296 dated Feb. 13, 2024 (3 pages).
(Continued)

*Primary Examiner* — Thien S Tran
(74) *Attorney, Agent, or Firm* — Imperium Patent Works; Darien K. Wallace

(57) ABSTRACT

A press-forming device for forming individual solder bodies from a wire of soldering material includes a press-forming mechanism and a separation means. The press-forming mechanism forms a continuous strand of preformed solder sections from the wire by using two notched rollers that rotate in opposite directions and that press opposite notches into the wire. The preformed solder sections are disposed equidistantly along the strand and are connected to each other by connecting links disposed at the notches. The separation means forms individual solder bodies by separating the preformed solder sections one by one at the connecting links. The separation means separates individual preformed solder sections using a cutting mechanism that moves in a direction perpendicular to the length direction of the strand. Individual solder bodies are transported to a solder jetting section where they are liquefied by a laser
(Continued)

beam and jetted from the solder jetting section by gas pressure.

18 Claims, 1 Drawing Sheet

(51) Int. Cl.
    *B23K 3/08*         (2006.01)
    *B23K 31/12*      (2006.01)

(56)           References Cited

U.S. PATENT DOCUMENTS

| | | | | |
|---|---|---|---|---|
| 6,152,348 | A * | 11/2000 | Finn | B23K 3/0623 228/52 |
| 6,634,545 | B2 | 10/2003 | Razon et al. | B23K 35/12 228/246 |
| 10,286,470 | B2 | 5/2019 | Azdasht | B23K 1/056 |
| 10,826,470 | B2 | 11/2020 | Zuo et al. | H03K 4/56 |
| 2016/0250704 | A1 | 9/2016 | Azdasht | B23K 1/0056 |
| 2016/0279725 | A1 | 9/2016 | Azdasht | B23K 1/0056 |
| 2021/0220934 | A1 * | 7/2021 | Azdasht | B23K 26/034 |

FOREIGN PATENT DOCUMENTS

| | | | |
|---|---|---|---|
| CN | 203936498 U | | 1/2014 |
| CN | 104325261 A | | 2/2015 |
| CN | 105149808 | | 12/2015 |
| CN | 106312358 | | 1/2017 |
| CN | 106312358 A | | 1/2017 |
| DE | 69032249 T2 | | 6/1991 |
| DE | 19541996 C2 | | 5/1997 |
| EP | 0457920 A1 | | 11/1991 |
| JP | 46-22562 | * | 6/1971 |
| JP | S46-22562 | | 6/1971 |
| JP | H8-500295 | | 1/1996 |
| JP | H08311508 A | | 11/1996 |
| JP | H11514933 A | | 5/1998 |
| JP | H11-514933 | | 12/1999 |
| JP | 2001-267730 | | 9/2001 |
| JP | 2006-320929 A | | 5/2005 |
| JP | 2006-320929 | | 11/2006 |
| JP | 2016112605 A | | 6/2016 |
| JP | 2016-533268 | | 10/2016 |
| WO | WO 95/00279 A1 | | 1/1995 |
| WO | WO-2018158077 A1 * | 9/2018 | ......... B23K 26/0613 |

OTHER PUBLICATIONS

Office action dated Feb. 19, 2024 of the Korean Patent Office in the related Korean patent application KR 10-2022-0123979 and an English translation of the Korean Office action (12 pages).

Office action dated Jun. 2, 2023 of the German Patent Office in the related German patent application DE102022121665.9 and an English translation of the German Office action (10 pages).

English translation of the Written Opinion in the ISA for the ISR in the related PCT application PCT/EP2020/083031 (6 pages).

Search Report dated Jun. 27, 2022 from the Luxembourg Patent Office in the related foreign application LU 500709 (6 pages).

Office action dated Aug. 14, 2023 of the Japanese Patent Office in the related Japanese patent application JP P2022-129296 and an English translation of the Japanese Office action (15 pages).

Office action dated Jan. 7, 2026 of the Chinese Patent Office in the related Chinese patent application CN 202211148152.7 and an English translation of the Chinese Office action (10 pages).

Search report dated Jan. 5, 2026 related to Office action dated Jan. 7, 2026 in the related Chinese patent application CN 202211148152.7 and an English translation of the search report (6 pages).

Office action dated Mar. 13, 2026 and associated search report of the Chinese Patent Office in the related Chinese patent application CN 202211148152.7 and an English translation of the Chinese Office action and search report (16 pages).

* cited by examiner

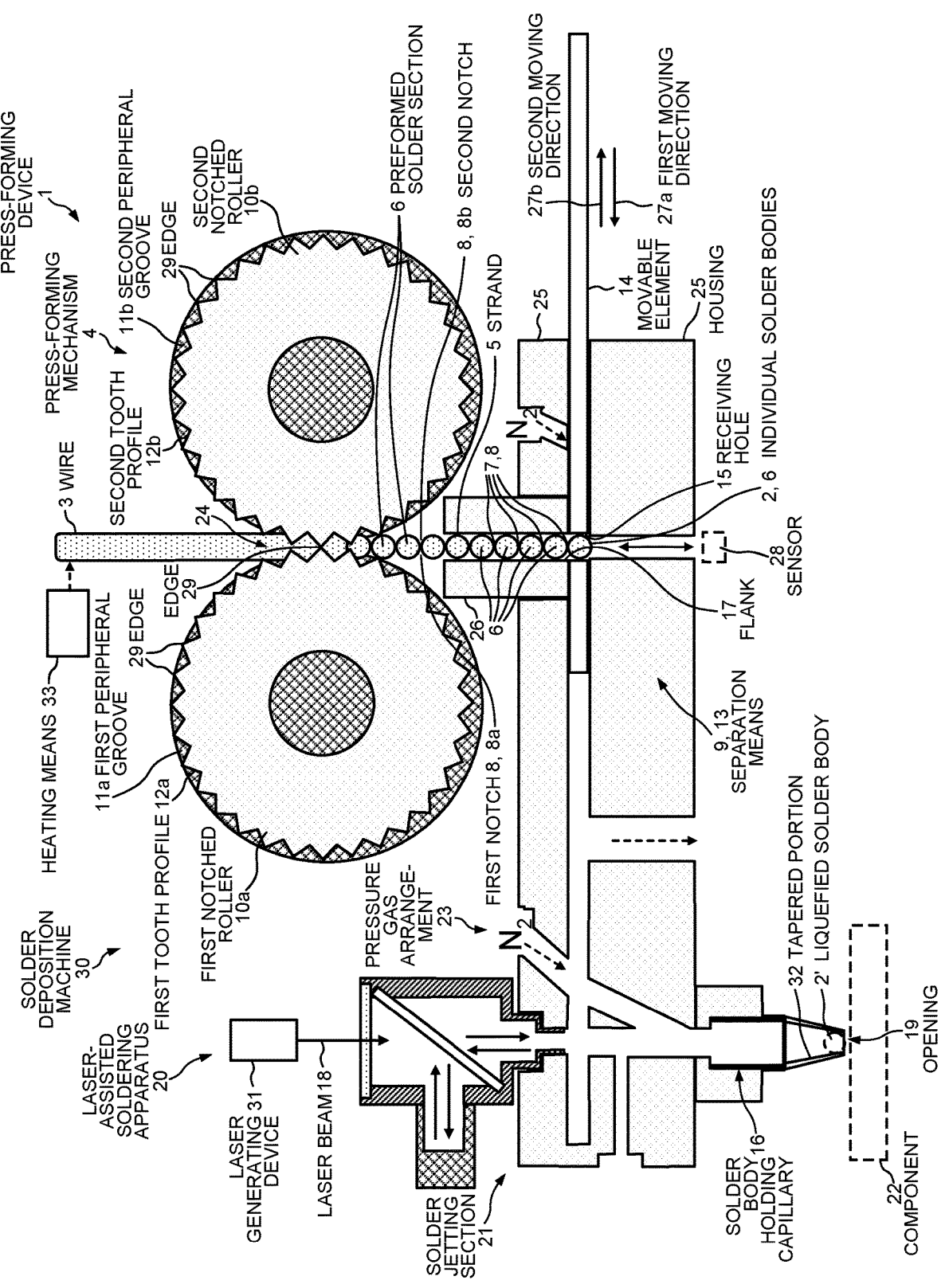

PRESS-FORMING DEVICE FOR DEPOSITING SOLDER AND PRODUCING INDIVIDUAL SOLDER BODIES

CROSS REFERENCE TO RELATED APPLICATION

This application is based on and hereby claims the benefit under 35 U.S.C. § 119 from Luxembourg Patent Application No. LU500709, filed on Oct. 6, 2021, in the Luxembourg Intellectual Property Office. This application is a continuation-in-part of Luxembourg Patent Application No. LU500709, the contents of which are incorporated herein by reference.

TECHNICAL FIELD

The present disclosure relates to a press-forming device and a method for producing individual solder bodies from a continuous wire of soldering material. Furthermore, the invention relates to a solder deposition machine and a laser-assisted soldering apparatus that includes the press-forming device.

BACKGROUND

Apparatus for applying solder bodies, i.e., solder balls, are well known. In this context, reference is made to U.S. Pat. No. 10,286,470 B2, for example. That patent document discloses an apparatus for the separate application of solder material deposits. In such an apparatus, a capillary is usually filled with individual solder balls, and the solder balls are melted from there and applied individually to the corresponding electronic component to be manufactured. The solder balls are usually held loosely in storage containers such as funnels, from where they are removed individually.

There are also different manufacturing methods, for example, for producing the solder balls more precisely and for making the shape of the solder balls as close as possible to an ideal spherical shape. Prior art in this respect is known, for example, from DE 69032249 T2.

However, due to the fact that the solder balls are held in separate reservoirs, there is the problem that the design of the corresponding apparatus is relatively complex. This in turn involves a relatively large assembly effort and takes up a relatively large amount of installation space. At the same time, there is a relatively large manufacturing effort in shaping the solder bodies in order to implement the handling of the solder bodies sufficiently precisely and reproducibly. It is also often necessary to use flux.

It is therefore an object of the present invention to reduce the manufacturing effort of solder bodies and at the same time to obtain the simplest possible structure of a laser-assisted soldering apparatus.

SUMMARY

The invention relates to a press-forming device for producing individual solder bodies from a continuous wire of soldering material, comprising: a press-forming mechanism configured for press-forming the wire so as to obtain a continuous strand of preformed solder sections, wherein the preformed solder sections are equidistantly arranged next to each other along the length of the strand and are connected to each other via connecting links formed by pressed notches, and separation means configured for separating individual solder bodies from the strand by separating the individual preformed solder sections one after the other at the connecting links. The invention also relates to a method of producing individual solder bodies from a continuous wire of soldering material. Furthermore, the invention relates to a laser-assisted soldering apparatus comprising the press-forming device and relates to a solder deposition machine with a laser-assisted soldering apparatus.

A press-forming device for forming individual solder bodies from a wire of soldering material includes a press-forming mechanism and a separation means. The press-forming mechanism forms a continuous strand of preformed solder sections from the wire by using first and second notched rollers that rotate in opposite directions and that press radially opposite notches into the wire. The preformed solder sections are disposed equidistantly along the continuous strand and are connected to each other by connecting links disposed at notches pressed into the wire by the press-forming mechanism. The separation means forms individual solder bodies by separating the preformed solder sections one by one at the connecting links. The separation means separates individual preformed solder sections using a cutting mechanism that moves in a direction perpendicular to the length direction of the strand.

Individual solder bodies are transported to a solder jetting section where they are liquefied by a laser beam and jetted from the solder jetting section by gas pressure. The separation means includes a movable element that separates the preformed solder sections from the strand to form the individual solder bodies. The movable element transports the individual solder bodies to a solder body holding capillary of the solder jetting section. The individual solder bodies are jetted from the solder jetting section by gas pressure applied into the solder body holding capillary.

A method for producing individual solder bodies from a wire of soldering material involves pressing opposite notches into the wire. The wire is press-formed so as to obtain a continuous strand of preformed solder sections. The preformed solder sections are disposed equidistantly next to each other along the continuous strand and are connected to each other by connecting links disposed at the notches that are pressed into the wire. Individual solder bodies are separated from the continuous strand of preformed solder sections by separating the individual preformed solder sections one by one at the connecting links. The press-forming is performed using a first notched roller and a second notched roller that rotate in opposite directions. The first notched roller and the second notched roller press the notches into the wire. The individual solder bodies are transported to a solder body holding capillary. Then the individual solder bodies are jetted from the solder body holding capillary using gas pressure applied into the solder body holding capillary.

Other embodiments and advantages are described in the detailed description below. This summary does not purport to define the invention. The invention is defined by the claims.

BRIEF DESCRIPTION OF THE DRAWING

The accompanying drawing, where like numerals indicate like components, illustrates an embodiment of the invention.

FIG. 1 shows a schematic sectional view of a laser-assisted soldering apparatus in which a press-forming device for producing and feeding solder bodies towards a solder jetting section according to a preferred embodiment can be seen in detail.

The FIGURE is merely schematic in nature and is intended solely for the purpose of understanding the invention. For example, it is noted that several "passages" are shown, for the sake of simplicity, as lying in the same cross-sectional plane of the laser-assisted soldering apparatus, while such "passages" actually may lie in different cross-sectional planes of the laser-assisted soldering apparatus.

DETAILED DESCRIPTION

Reference will now be made in detail to some embodiments of the invention, examples of which are illustrated in the accompanying drawing.

FIG. 1 shows a novel press-forming device 1 that produces individual, preferably ball-shaped or ball-like, solder bodies (also referred to as preforms) from a continuous wire of soldering material. The effort expended to manufacture solder bodies can be reduced by using the press-forming device 1. The novel press-forming device 1 includes a press-forming mechanism 4 configured for press-forming a wire 3 so as to obtain a continuous strand 5 of preformed solder sections, which are equidistantly arranged next to each other along the length of the strand 5 and are connected to each other via connecting links 7 formed by pressed notches 8 (pressed into the wire 3). The press-forming device 1 also includes separation means 9 configured to separate individual solder bodies 2 from the strand 5 by separating the individual preformed solder sections one after the other at the connecting links 7. The shape, size and weight of the press-formed solder sections is determined by the press-forming contour of the press-forming mechanism 4 and correspond to the solder bodies 2 to be produced.

As a result, the soldering material can be held as a wire 3 that is unwound from a coil at the entrance to the press-forming mechanism 4. The solder bodies 2 are then formed directly from this wire 3 so as to avoid the use of flux. The manufacturing process for the solder bodies 2 is thus significantly reduced. Because the formed strand 5 of preformed solder sections is transferred directly to the separation means 9, the construction design is simple. Further advantages of the novel press-forming mechanism 4 include: contactless process, minimal mechanical loads when setting up the solder connection, significantly more compact design, minimally invasive process, interaction time in the millisecond-range, no interaction with surrounding components, temperature measurement and regulation by the capillary, and solder bodies 2 (also referred to as molded parts) that are inexpensively produced and commercially available from fluxless solder wire in a flux-free process.

In another aspect, the press-forming mechanism 4 is configured to press radially opposite notches 8 into the wire 3 and, more preferably, to form ball-shaped or ball-like wire sections into the wire 3. This allows solder bodies 2 to be formed as precisely as possible by simple means.

According to a further aspect, the press-forming mechanism 4 includes a pair of notched rollers 10 that are driven in opposite directions, each having a peripheral groove 11 for guiding the wire 3 through a forming space between the notched rollers 10. These peripheral grooves 11 allow thicker wires to be used and thus larger solder bodies 2 to be precisely produced.

In another aspect, a first tooth profile 12a is disposed inside the peripheral groove 11a of a first notch roller 10a, and a second tooth profile 12b is disposed inside the peripheral groove 11b of a second notch roller 10b. The tooth profiles determine the shape of the preformed solder sections. This allows symmetrical, preferably ball-shaped or ball-like, solder bodies 2 to be formed as precisely as possible. The tooth profiles of the first and second notched rollers 10 define the shape, size and weight of each press-formed solder section and are designed so as together to form the negative shape of the solder bodies 2 to be produced.

In this context, another aspect is that the tooth profile consists of teeth having preferably linear pressure edges 29. This allows the notch 8 to be formed as thinly as possible. This helps to avoid undesirable extensions from remaining on the solder bodies 2 separated from the strand 5 of preformed solder sections.

In another aspect, the press-forming device 1, in particular the press-forming mechanism 4, includes a forming punch movable relative to a die with the wire 3 being inserted between them. This is another way to keep the design of the press-forming mechanism 4 as simple as possible.

According to another aspect, the separation means 9 includes a shear cutting mechanism 13 configured to separate individual solder sections from the strand 5 of preformed solder sections to form individual solder bodies 2 in a direction transversely to the length direction or advancing/feeding direction of the strand 5 of preformed solder sections. As a result, the separation process of the solder bodies 2 from the strand 5 is carried out by a separation means 9 that is also as simple as possible in design.

In another aspect, the shear cutting mechanism 13 includes a movable element 14 that is driven in a translatory manner transversely to the length direction of the strand 5 of the preformed solder sections. Preferably, the movable element 14 is a sliding plate or a sliding pin. This enables the press-forming device 1 to be designed to be even more compact in terms of installation space.

According to another aspect, the shear cutting mechanism 13 includes a movable element 14 that is driven in a rotational manner transversely to the length direction of the strand 5 of preformed solder sections. Preferably, the movable element 14 is a disk, e.g., in the shape of a circular conveying disk as disclosed in U.S. Pat. No. 10,826,470. This makes it easier to temporarily store several loose solder bodies 2 already separate from the strand 5. A faster application process is thus possible.

In one aspect, the movable element 14 forms a receiving hole 15 that is configured to receive and separate a preformed solder section for making the loose solder body. The shear cutting mechanism 13 has flanks 17 that are fixed to or directly formed by a housing. The flanks 17 are dimensioned and arranged in such a way that, when the movable element 14 moves relative to these flanks 17, the preformed solder section received in the receiving hole 15 is separated and cut off from the strand 5 along the directly adjoining notch 8 of the strand 5. This further simplifies the construction of the shear cutting mechanism 13.

According to an aspect, the press-forming device 1 further includes a feeding means configured to feed the wire 3 of soldering material towards the press-forming mechanism 4. This reliably controls the feed of the wire 3.

According to another aspect, a heating means 33 is provided for heating the wire 3 to a certain temperature before the wire 3 becomes press-formed. The heating means 33 can be configured as a separate unit being separate from the press-forming mechanism 4, such as a hot-air nozzle, or as a unit that is integrated into the press-forming mechanism 4, such as electric heating coils or heat pipes integrated into at least one of the two notched rollers 10.

In another embodiment, a laser-assisted soldering apparatus 20 includes a press-forming device 1 in accordance with any of the preceding aspects and a solder jetting section 21 for holding a solder body to be liquefied by a laser beam. This results in an efficiently controllable overall apparatus that is compact in design. For example, the laser-assisted soldering apparatus 20 is designed as a machining head for a robot.

In one aspect of the laser-assisted soldering apparatus 20, the movable element 14 of the separation means 9 is configured to transport a solder body from the strand 5 of the preformed solder sections to a solder body holding capillary 16 of the solder jetting section 21. Doing so combines a separation means 9 with a transport means for the solder body.

In another embodiment, a solder deposition machine 30 includes a laser-assisted soldering apparatus 20 according to any of the preceding aspects and a laser generating device 31 arranged and configured to produce a laser beam 18 for melting a solder body inside a solder body holding capillary 16.

A novel method for producing individual solder bodies 2 from a continuous wire 3 of soldering material involves press-forming the wire 3 so as to obtain a continuous strand 5 of preformed solder sections. The preformed solder sections are equidistantly arranged next to each other along the length of the strand 5 and are connected to each other via connecting links 7 formed by notches 8 pressed into the wire 3. The method involves separating the solder bodies 2 from the strand 5 of the preformed solder sections by separating the individual preformed solder sections one after the other at the connecting links 7.

FIG. 1 shows the laser-assisted soldering apparatus 20 for soldering an electronic component 22, such as a circuit board. The apparatus 20 is constructed as a machine/bond head that is supported by a robot arm. The electronic component 22 represents a through-hole device to which a pin is affixed via soldering. The general principle of apparatus 20 is disclosed in U.S. Pat. No. 10,826,470. Thus, the field of application of the apparatus 20 is a solder deposition machine 30.

The solder deposition machine 30 includes among others a laser generating device 31 configured to produce a laser beam 18. In addition, the solder deposition machine 30 includes a robotic system for moving the device 1 and controlling the laser beam 18 produced by the laser generating device 31 during operation.

In the embodiment shown in FIG. 1, a solder body 2, such as in the form of a solder ball, is liquefied and jetted by using a solder jetting section 21 of the apparatus 20. The solder jetting section 21 includes a solder body holding capillary 16. The capillary 16 is tapered towards its opening 19 at the end facing the component 22. In particular, the diameter of the opening 19 of the capillary 16 is smaller than the minimal diameter of the solid solder body 2 that is to be melted into a liquefied solder body 2'. As a result, the solid solder body 2 is held at a position where the diameter of the tapered capillary 16 corresponds to the diameter of the solid solder body 2. The diameter of a solid solder body 2 in the form of a ball is preferably 500 μm or larger.

In order to jet the liquefied solder body 2' towards the spot on the component 22 to be soldered, gas pressure is applied into the capillary 16 by a pressure gas arrangement 23. Preferably an inert gas, such as nitrogen ($N_2$), is used for this purpose. Thus, the pressure gas arrangement 23 functions to press a solid solder body 2 into the capillary 16 by introducing gas into the capillary 16 in a region opposite the opening 19 with respect to a tapered portion 32 of the capillary 16 that holds the solid solder body 2.

Specifically, the solder jetting section 21 is configured to enable the laser beam 18, which is generated in a conventional manner by the laser generating device 31, to liquefy the solder body 2. The laser beam 18 is directed towards the solid solder body 2 in order to produce the liquefied solder body 2'. When the solid solder body 2 is liquefied, the liquefied solder body 2' becomes deformed such that it can exit the capillary 16 and is jetted out of the capillary 16 through the opening 19 towards the component 22, due to the pressure inside the capillary 16.

In order to control and move the apparatus 20, i.e., the capillary 16 relative to the electronic component 22, and to control the laser beam 18, i.e., the power and duration of the laser beam 18 and the pressure gas arrangement 23, the apparatus 20 includes a control means and a drive means (not shown). The control means is implemented by a computer including a CPU, a memory, and an input/output means. The memory stores a control program that is executed by the CPU. The drive means is implemented by electromechanical drives that position the capillary 16 and by other means of the apparatus 20, such as holding means (not shown) that hold the electronic component 22.

During the heating of the solid solder body 2, the temperature of the solder body 2 is measured and then controlled using the laser beam. A controller is used to change the laser power (current) so that the temperature of the liquefied solder body 2' is regulated to a set point. The temperature is preferably measured using an infrared (IR) sensor with appropriate optics without contacting the heated solder body 2, 2'. The IR sensor preferably also uses the optical laser path.

The novel press-forming device 1 produces individual solder bodies 2 from a continuous wire 3 of soldering material. In one embodiment, the press-forming device 1, the soldering apparatus 20, and the solder jetting section 21 are integrally formed as a single unit. In another embodiment, the press-forming device 1 is a separate unit that is attachable to and detachable from the solder jetting section 21.

The press-forming device 1 includes a press-forming mechanism 4 for press-forming the solid wire 3 of soldering material. The wire 3 is preferably fed from a coil (not shown) held at a predetermined distance from the press-forming mechanism 4. Via feeding means (not shown), the wire 3 of soldering material is fed to the press-forming mechanism 4.

The press-forming mechanism 4 of FIG. 1 includes two notched rollers 10a and 10b. These two notched rollers 10a and 10b are rotatably arranged about their rotational axes and mounted rotatably relative to a housing 25 of the apparatus 20.

The pair of notched rollers 10a, 10b are driven in opposite directions and are spaced apart from each other in such a way that the wire 3 is moved along a straight line through a forming space 24 defined between the notched rollers 10a, 10b. The peripheral surface profiles of the pair of notched rollers 10a, 10b are designed so as to form a continuous and straight strand 5 of preformed solder sections 6. These preformed solder sections 6 are equidistantly arranged next to each other along the length of the strand 5 and are connected to each other via connecting links 7 formed by notches 8 pressed into the wire 3.

For guiding the wire 3 during its movement through the forming space 24, each notched roller 10a, 10b is provided with a peripheral groove 11a, 11b. A first notched roller 10a is provided with a first peripheral groove 11*a*, and a second notched roller 10*b* is provided with a second peripheral groove 11*b*. The two peripheral grooves 11*a*, 11*b* are opposite each other, and each receives a portion of the wire 3.

Furthermore, each notched roller 10*a*, 10*b* has a tooth profile 12*a*, 12*b* inside its peripheral groove 11*a*, 11*b*. This tooth profile 12*a*, 12*b* directly determines the press form of the strand 5 including the preformed solder sections 6 and the notches 8. Specifically, the tooth profiles 12*a*, 12*b* of the first and second notched rollers 10*a*, 10*b* define the shape, size and weight of each press formed solder section 6 and are designed so as to commonly form a negative shape of the solder bodies 2 to be produced. In this embodiment, each tooth profile 12*a*, 12*b* extends continuously in the circumferential direction. The edges 29 of the teeth of each tooth profile 12*a*, 12*b* are straight.

Each tooth of the tooth profile 12*a*, 12*b* forms a preferably linear pressure edge 29 extending into the drawing plane of FIG. 1. In other words, a tooth head of each tooth of each tooth profile 12*a*, 12*b* has two flat side flanks facing away from each other in circumferential direction and intersecting at the pressure edge 29. However, this form of the tooth profile 12*a*, 12*b* may of course vary according to the intended form of the preformed solder sections 6.

In other words, a first tooth profile 12*a* of the first notched roller 10*a* deforms the wire 3 at a first radial side, and a second tooth profile 12*b* of the second notched roller 10*b* deforms the wire 3 at a second radial side, opposite to the first radial side, by creating the strand 5 comprising the preformed solder sections 6 and the notches 8. Under closer inspection, it becomes clear that each notch 8 includes a first notch 8*a* (on the first radial side) formed by the first notched roller 10*a* and a second notch 8*b* (on the second radial side) formed by the second notched roller 10*b* on an opposite side of the strand 5.

Thus, during the operation of the apparatus 20, the two notched rollers 10*a*, 10*b* are preloaded with a certain force towards each other, thereby pressing their tooth profiles 12*a*, 12*b* into the wire 3 during rotation about their rotational axis and corresponding movement of the wire 3.

As can further be seen in FIG. 1, each of the two notched rollers 10*a*, 10*b* has the same design. However, it is to be noted that in modified embodiments, the two notched rollers 10*a*, 10*b* may be configured differently.

Furthermore, in another modified embodiment, the notched rollers 10*a*, 10*b* may be replaced by a punching mechanism. In this regard, the press-forming mechanism 4 then preferably includes at least a die (also referred to as lower die) and a forming punch (also referred to as upper die) transversely movable relative to the die with the wire 3 being inserted between them, wherein the die and the forming punch are provided with the negative profile of the strand 5 to be formed.

Before the wire 3 is inserted into the press-forming mechanism 4, a heating means 33 heats the wire 3 to a certain temperature. This heating serves to improve the formability of the material of the wire 3 in order to avoid microcracks. The heating means 33 is provided in FIG. 1 as a separate heating unit/device, preferably as a hot-air device with a hot-air nozzle. The heating means 33 is therefore positioned between the coil and the press-forming mechanism 4.

However, it is to be noted that in modified embodiments the heating means 33 can also be designed and/or positioned differently. Thus, the heating means 33 can even be provided as a unit that is integrated into the press-forming mechanism

4, preferably including electric heating coils or heat pipes integrated into at least one of the two or both notched rollers 10*a*, 10*b*.

Besides the press-forming mechanism 4, the device 1 includes a separation means 9 that is configured to separate the individual solder bodies 2 one by one from the strand 5. Thus, each solder body 2 that is used for the soldering in the solder jetting section 21 is directly provided by a preformed solder section 6 of the strand 5.

In the separation means 9, the preformed solder section 6 breaks at the connecting link 7 towards the adjacent preformed solder section 6 for forming the individual solder body 2. Thus, the connecting link 7/notch 8 is a perforation along which the preformed solder section 6 breaks.

FIG. 1 also shows that the separation means 9 includes a shear cutting mechanism 13. This shear cutting mechanism 13 in turn includes a movable element 14. The movable element 14 is movable transversely to the longitudinal direction of the strand 5. The movable element 14 is provided as a sliding plate slidably received inside the housing 25. In one embodiment, the housing 25 directly forms the housing of the apparatus 20 and therefore of the solder jetting section 21. In this context, it is to be noted that in other embodiments the movable element 14 has a different form, such as a slidable pin or a rotatable disk.

FIG. 1 also shows that housing 25 includes an insertion socket 26 through which the strand 5 is inserted into the housing 25. The insertion socket 26 is placed in a position such that the strand 5 extends along a straight line between the press-forming mechanism 4 and the inside of the housing 25, even up to the movable element 14.

The movable element 14 is provided with a receiving hole 15 arranged and dimensioned for receiving one of the preformed solder sections 6. The receiving hole 15 can be provided as a through hole. The receiving hole 15 is open at least towards the side of the press-forming mechanism 4. Thus, the receiving hole 15 is a dimensioned according to the dimension of the preformed solder section 6/solder body 2. At least the length of the receiving hole 15 (dimension transverse to the moving direction of the movable element 14) corresponds to the length of the preformed solder section 6.

The bottom edge of the passage through the insertion socket 26 forms a flank 17. The movable element 14 interacts with the flank 17 of the housing 25 to function as the shear cutting mechanism 13. FIG. 1 illustrates that, after inserting a preformed solder section 6 into the receiving hole 15 in the illustrated first position of the movable element 14, and by moving the movable element 14 along a first moving direction 27*a* (transverse to the portion of the strand 5 inserted into the housing 25) from the first position to a second position, the portion of the strand 5 outside the receiving hole 15 is placed in alignment with the flank 17. Then the preformed solder section 6 disposed inside the receiving hole 15 is broken away from the strand 5 to form an individual solder body 2.

Moreover, FIG. 1 also shows that the movable element 14 also forms a part of a transport unit for transporting the solder body 2 from the first position to a second position in which the solder body 2 can be conveyed into the capillary 16, preferably by activating the pressure gas arrangement 23. After having delivered the solder body 2 in the second position towards the capillary 16, the movable element 14 is returned to the first position by sliding the movable element 14 in a second moving direction 27*b* opposite the first moving direction 27*a*. For this reason, it is preferred that the movement of the wire 3 and the press-forming mechanism 4 are stopped when the movable element 14 is disposed outside the first position.

As can further be seen, it is advantageous when a sensor 28 is provided for detecting the presence of a preformed solder section 6 or solder body 2 inside the receiving hole 15. This sensor 28 is preferably provided on the opposite side of the housing 25 with respect to the insertion socket 26.

LIST OF REFERENCE NUMBERS

1 press-forming device
2 individual solder body
2' liquefied solder body
3 wire
4 press-forming mechanism
5 strand
6 preformed solder section
7 connecting link
8 notch
8a first notch
8b second notch
9 separation means
10a first notched roller
10b second notched roller
11a first peripheral groove
11b second peripheral groove
12a first tooth profile
12b second tooth profile
13 shear cutting mechanism
14 movable element
15 receiving hole
16 solder body holding capillary
17 flank
18 laser beam
19 opening
20 laser-assisted soldering apparatus
21 solder jetting section
22 component
23 pressure gas arrangement
24 forming space
25 housing
26 insertion socket
27a first moving direction
27b second moving direction
28 sensor
29 edge
30 solder deposition machine
31 laser generating device
32 tapered portion
33 heating means Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A press-forming device for forming individual solder bodies from a wire of soldering material, comprising:

a press-forming mechanism configured to form a continuous strand of preformed solder sections from the wire, wherein the press-forming mechanism is configured to press radially opposite notches into the wire, thereby forming ball-shaped preformed solder sections, wherein the preformed solder sections are disposed equidistantly along the continuous strand, wherein the preformed solder sections are connected to each other by connecting links disposed at notches pressed into the wire by the press-forming mechanism, wherein the press-forming mechanism includes a first notched roller and a second notched roller that rotate in opposite directions, wherein the first notched roller and the second notched roller radially press the radially opposite notches into the wire, wherein the first notched roller has a first peripheral groove, and the second notched roller has a second peripheral groove, and wherein the first peripheral groove and the second peripheral groove guide the wire through the press-forming mechanism in an advancing direction planar with the first notched roller and the second notched roller; and a separation cutter configured to form individual solder bodies by separating the preformed solder sections one by one at the connecting links.

2. The device of claim 1, wherein the press-forming mechanism is configured to press profiled notches into the wire.

3. The device of claim 1, wherein the first notched roller and the second notched roller have parallel rotational axes, and wherein the wire is guided perpendicularly to the rotational axes of the first notched roller and the second notched roller.

4. The device of claim 1, wherein each of the first notched roller and the second notched roller has a tooth profile, and wherein the preformed solder sections have shapes determined by the tooth profile.

5. The device of claim 1, wherein the separation cutter includes a cutting mechanism that separates individual preformed solder sections from the strand to form the individual solder bodies, and wherein the cutting mechanism moves in a direction perpendicular to a length direction of the strand.

6. The device of claim 1, wherein the separation cutter includes a cutting mechanism that has a movable element, and wherein the movable element moves linearly in a direction perpendicular to a length direction of the strand.

7. The device of claim 1, wherein the separation cutter includes a cutting mechanism that has a movable element, and wherein the movable element moves rotationally in a plane perpendicular to a length direction of the strand.

8. The device of claim 1, wherein the separation cutter includes a cutting mechanism that has a movable element, and wherein the movable element includes a receiving hole configured to receive a preformed solder section.

9. A laser-assisted soldering apparatus, comprising:

a press-forming mechanism configured to form a continuous strand of preformed solder sections from a wire of soldering material, wherein the press-forming mechanism is configured to press radially opposite notches into the wire, thereby forming ball-shaped preformed solder sections, wherein the preformed solder sections are disposed equidistantly along the continuous strand, and wherein the preformed solder sections are connected to each other by connecting links disposed at notches pressed into the wire by the press-forming mechanism, wherein the press-forming mechanism includes a first notched roller and a second notched roller that rotate in opposite directions, wherein the first notched roller and the second notched roller radially press the radially opposite notches into the wire, wherein the first notched roller has a first peripheral groove, and the second notched roller has a second peripheral groove, and wherein the first peripheral groove and the second peripheral groove guide the wire through the press-forming mechanism in an advancing direction planar with the first notched roller and the second notched roller;

a separation cutter configured to form individual solder bodies by separating the preformed solder sections one by one at the connecting links; and a solder jet that holds individual solder bodies while the individual solder bodies are being liquefied by a laser beam, wherein upon being liquefied the individual solder bodies are jetted from the solder jet.

10. The apparatus of claim 9, wherein the separation cutter includes a movable element that separates the preformed solder sections from the strand to form the individual solder bodies, and wherein the movable element transports the individual solder bodies to a solder body holding capillary of the solder jet.

11. The apparatus of claim 10, wherein the individual solder bodies are jetted from the solder jet by gas pressure applied into the solder body holding capillary.

12. The apparatus of claim 10, further comprising:

a laser generating device that directs a laser beam towards individual solder bodies disposed in the solder body holding capillary.

13. The apparatus of claim 10, further comprising:

a laser generating device that emits a laser beam axially through the solder body holding capillary.

14. The apparatus of claim 10, further comprising:

an infrared temperature sensor adapted to measure a temperature of individual solder bodies in the solder body holding capillary.

15. The apparatus of claim 9, wherein the first notched roller and the second notched roller have parallel rotational axes, and wherein the wire is guided perpendicularly to the rotational axes of the first notched roller and the second notched roller.

16. A method for producing individual solder bodies from a wire of soldering material, comprising:

press-forming the wire so as to obtain a continuous strand of preformed solder sections, wherein radially opposite notches are pressed into the wire, thereby forming ball-shaped preformed solder sections, wherein the preformed solder sections are disposed equidistantly next to each other along the continuous strand and are connected to each other by connecting links disposed at notches pressed into the wire, wherein the press-forming mechanism includes a first notched roller and a second notched roller that rotate in opposite directions, wherein the first notched roller and the second notched roller radially press the radially opposite notches into the wire, wherein the first notched roller has a first peripheral groove, and the second notched roller has a second peripheral groove, and wherein the first peripheral groove and the second peripheral groove guide the wire through the press-forming mechanism in an advancing direction planar with the first notched roller and the second notched roller; and separating individual solder bodies from the continuous strand of preformed solder sections by separating the individual preformed solder sections one by one at the connecting links.

17. The method of claim 16, wherein the first notched roller and the second notched roller have parallel rotational axes, and wherein the wire is guided perpendicularly to the rotational axes of the first notched roller and the second notched roller.

18. The method of claim 16, further comprising:

transporting individual solder bodies to a solder body holding capillary; and jetting individual solder bodies from the solder body holding capillary using gas pressure applied into the solder body holding capillary.

* * * * *